3,273,964
PROCESS FOR PRODUCING BROMINE FROM A MIXTURE OF HYDROGEN BROMIDE AND OLEFINIC HYDROCARBON
Armand J. De Rosset, Clarendon Hills, Ill., assignor to Universal Oil Products Company, Des Plaines, Ill., a corporation of Delaware
No Drawing. Filed Feb. 28, 1963, Ser. No. 262,817
9 Claims. (Cl. 23—216)

This invention relates to a novel catalyst-adsorbent composite for the separation of hydrogen bromide from a dehydrobromination reaction mixture and recovery of elemental bromine therefrom.

Olefinic hydrocarbons are prepared from more saturated hydrocarbons by halogenation of the more saturated hydrocarbon and dehydrohalogenation of the resulting halohydrocarbon. Halogenation is usually effected by direct halogenation of the more saturated hydrocarbon with elemental halogen, and dehydrohalogenation is usually effected by heating the resulting halohydrocarbon at decomposition temperature and forming a dehydrohalogenation reaction mixture comprising the olefinic hydrocarbon product and hydrogen halide. Olefinic hydrocarbons can be economically prepared in the aforesaid manner provided that the resulting hydrogen halide can be efficiently separated from the dehydrohalogenation reaction mixture, and further provided that substantially all of the halogen can be regenerated from the hydrogen halide for use in the first-mentioned halogenation step.

Hydrogen bromide can be efficiently separated from a dehydrobromination reaction mixture by contacting said mixture with certain of the basic metal oxides, for example an oxide of magnesium, calcium, zinc, etc., and adsorbing the hydrogen bromide thereon. Furthermore, substantially all of the bromine can be regenerated from the adsorbed hydrogen bromide at conditions effecting the oxidation of combined bromine, particularly when the selected basic metal metal oxide is composited with an oxide of copper, cerium nickel, thorium, etc., or other catalytic material active in the oxidation of combined bromine. However, utility of the aforesaid basic metal oxides is unduly limited in that the initially high capacity for adsorbed hydrogen bromide is substantially reduced during the course of the process in which adsorption and oxidation of hydrogen bromide is continuously alternated to effect a continuous type of operation. In addition, regeneration of bromine becomes increasingly difficult.

It is one object of this invention to present an improved method of separating hydrogen bromide from a dehydrobromination reaction mixture and recovering elemental bromine therefrom. A more specific object of the present invention is to present an improved basic metal oxide composite for adsorbing hydrogen bromide from a dehydrobromination reaction mixture, and more particularly, for adsorbing said hydrogen bromide and effecting substantially complete regeneration of bromine therefrom.

In one of its broad aspects the present invention embodies a method of separating hydrogen bromide from a dehydrobromination reaction mixture and recovering elemental bromine therefrom, which method comprises contacting said reaction mixture with a catalyst-adsorbent composite, said composite comprising an oxide of a metal selected from the group consisting of magnesium, calcium, and zinc composited with an oxide of a metal of Group IV–B of the Periodic Table, sorbing the hydrogen bromide on said composite and contacting the sorbed hydrogen bromide with an oxygen-containing gas at conditions effecting the oxidation of combined bromine.

Other objects and embodiments of this invention will become apparent in the following detailed specification.

The dehydrobromination reaction mixture herein contemplated is that resulting from the dehydrobromination of a dehydrobrominatable alkyl bromide, for example, ethyl bromide, propyl bromide, butyl bromide, pentyl bromide, hexyl bromide, heptyl bromide, octyl bromide, nonyl bromide, and higher homologs thereof containing up to about 20 carbon atoms, and also the various position and structural isomers thereof including 2-bromopropane, 2-bromobutane, 2-bromopentane, 3-bromopentane, 2-bromohexane, 3-bromohexane, t-butyl bromide, 2-bromo-2-methylbutane, 2-bromo-2,3-dimethylbutane, 2-bromo-2-methylpentane, 3-bromo-3-methylpentane, 2-bromo-2,3-dimethylpentane, 2-bromo-2,4-dimethylpentane, 2-bromo-2-methylhexane, and the like, and also cycloalkyl bromides, such as cyclobutyl bromide, cyclopentyl bromide, cyclohexyl bromide, cycloheptyl bromide, etc., and also alkyl dibromides including 2,3-dibromobutane, 2,3-dibromo-2-methylbutane, 2,3-dibromo-2,3-dimethyl butane, 2,3-dibromopentane, 2,3-dibromo-2-methylpentane, 2,3-dibromo-3-methylpentane, 2,3-dibromo-2,3-dimethylpentane, 2,3-dibromohexane, 2,3-dibromo-2-methylhexane, 2,3-dibromo-2,3-dimethylhexane, 3,4-dibromo-3-methylhexane, 3,4-dibromo-3,4-dimethylhexane, etc., to yield a corresponding olefin and hydrogen bromide.

Dehydrobromination is usually effected at a temperature of from about 50° C. to about 550° C., a temperature in the lower range of from about 50° C. to about 450° C. being suitable in the treatment of monobromides, and a temperature in the higher range of from about 200° C. to about 550° C. being suitably employed in the treatment of dibromides. Dehydrobromination is preferably effected in contact with the catalyst-adsorbent composite hereinafter described which is an active promoter with respect to dehydrobromination of alkyl bromides.

The dehydrobromination reaction mixture comprises an olefinic hydrocarbon admixed with hydrogen bromide. In accordance with the method of this invention, hydrogen bromide is separated from the dehydrobromination reaction mixture on contacting said reaction mixture with a catalyst-adsorbent composite and sorbing the hydrogen bromide thereon. The catalyst-adsorbent composite of this invention comprises a basic metal oxide composited with an oxide of a metal of Group IV–B of the Periodic Table, the said basic metal oxide consisting of an oxide of a metal selected from the group consisting of magnesium, calcium, and zinc. Group IV–B relates to the Periodic Table as presented on pp. 400–401 of the 39th edition (1957–58) of the "Handbook of Physics and Chemistry." An oxide of a metal of Group IV–B thus includes an oxide of titanium, zirconium, and hafnium. The basic metal oxide can be composited with the Group IV–B metal oxide in a mole ratio of from about 0.5:1 to about 10:1 to form a suitable catalyst-adsorbent composite. In a preferred embodiment of this invention, the catalyst-adsorbent composite comprises magnesia composited with zirconia, preferably in a mole ratio of from about 0.5:1 to about 5:1.

The catalyst-adsorbent composite herein described, selectively adsorbs hydrogen bromide from the dehydrobromination reaction mixture. Furthermore, the adsorptive capacity of the basic metal oxide for hydrogen bromide is considerably increased, particularly in the case of magnesia, as will become apparent with reference to the appended examples.

Elemental bromine is recovered from the adsorbed hydrogen bromide by contacting the adsorbed hydrogen bromide with oxygen, or an oxygen-containing gas such as air, at conditions effecting the oxidation of combined bromine. Conditions effecting the oxidation of combined bromine, such as hydrogen bromide, relate principally to temperature. Substantially complete regeneration of bromine can be effected by contacting the adsorbed hydrogen bromide with oxygen or an oxygen-containing gas at a temperature of from about 50° C. to about 450° C., particularly when the aforesaid catalyst-adsorbent composite is further composited with an oxide of copper and/or an oxide of cerium.

In the process of adsorbing hydrogen bromide from the dehydrobromination reaction mixture as herein contemplated, the presence of copper or cerium oxide in excessive amounts is undesirable as said oxides tend to oxidize hydrogen bromide on contact therewith to form elemental bromine which in turn tends to add to the olefinic hydrocarbon product present in the dehydrobromination reaction mixture being treated. The above-described composite may contain from about 0.1 wt. percent to about 15 wt. percent of an oxide of copper or an oxide of cerium with beneficial effect. However, a catalyst-adsorbent composite containing from about 1.0 wt. percent to about 10 wt. percent copper oxide is preferred.

The catalyst-adsorbent composite utilized in accordance with the method of this invention, may be prepared in any conventional or otherwise convenient manner. One suitable method comprises commingling an aqueous solution of a soluble compound of magnesium, calcium, or zinc for example magnesium chloride, magnesium sulfate, calcium chloride, calcium sulfate, zinc chloride, zinc sulfate, etc., with an aqueous solution of a soluble compound of a Group IV–B metal, for example zirconium oxychloride, titanium tetrachloride, hafnium oxychloride, etc. The resulting solution is further commingled with caustic solution to coprecipitate the desired components. For example, an aqueous solution of magnesium chloride is commingled with an aqueous solution of zirconium oxychloride and the resulting solution is made alkaline by addition of dilute sodium hydroxide solution thereto. The resulting precipitate is recovered, water-washed and dried. The washed and dried composite is thereafter calcined at a temperature of at least 400° C., generally at a temperature of about 400° C. to about 800° C., and preferably at a temperature of from about 500° C. to about 700° C. Calcination may be effected in the presence of air or other oxidizing media, or in the presence of nitrogen or other inert atmosphere. The calcined composite is preferably further water-washed to remove any remaining traces of sodium ion, or other alkali metal ion, which may be present, thus obviating the subsequent formation of difficultly oxidizable alkali metal bromides when exposed to hydrogen bromide. The calcined composite may be formed in particles of definite size and shape, for example, by commingling a powdered form thereof with a suitable pelleting agent, including hydrogenated vegetable oils, graphite, and the like, and compressing the same into pellets. The composite may also be formed into the desired shape by extrusion methods, or utilized as granules of varied configuration.

The oxide of copper or cerium can be composited with the above-described composite by conventional methods. For example, the composite can be soaked, dipped, or otherwise immersed in an ammonical aqueous solution of a soluble compound of copper or cerium, for example, copper nitrate, cerium nitrate, etc., for a suitable period during which the excess water is evaporated therefrom, or after which the excess solution is decanted therefrom. The foregoing may be accomplished prior to calcination of the aforementioned composite or subsequent thereto. In the latter case calcination is repeated substantially as described.

The method of this invention can be utilized to effect a continuous type of operation. For example, the alkyl bromide is charged to a reactor at dehydrobromination reaction conditions, said reactor containing therein a fixed bed of catalyst-adsorbent composite herein described. The olefinic hydrocarbon product is recovered from the reactor effluent and hydrogen bromide is adsorbed on the composite. Before the hydrogen bromide capacity of the catalyst-adsorbent composite is reached or exceeded, the alkyl bromide charged is halted and the adsorbed hydrogen bromide oxidized to bromine and water by passing a stream of air over the adsorbed hydrogen bromide at conditions effecting the oxidation of the same. Elemental bromine is recovered from the reactor effluent. The alkyl bromide charge is periodically alternated with the air flow to effect a continuous type of operation.

The method of this invention has been described in terms of adsorbing hydrogen bromide on the catalyst-adsorbent composite. It is contemplated that the hydrogen bromide is sorbed on the catalyst-adsorbent composite in physical and/or chemical combination therewith in such a manner that at least some portion of the bromine exists in a combined form other than hydrogen bromide, for example magnesium bromide. However, it is not intended to limit the method of this invention by such theoretical consideration since in either case elemental bromine is readily regenerated on subsequent oxidation.

The solid adsorbent composite of this invention presents a number of advantages. For example, hydrogen bromide is readily separated from the olefinic hydrocarbon product either during the dehydrobromination reaction or subsequent thereto. In either case, the hydrogen bromide is bound in physical and/or chemical combination with the solid adsorbent composite in preference to recombination or reaction with the olefinic hydrocarbon product. Furthermore, optimum separation of hydrogen bromide and recovery of elemental bromine is readily obtained over extended periods of operation.

The following examples are presented in illustration of the method of this invention. It is not intended that said examples shall act as an undue limitation of the generally broad scope of this invention as set out in the appended claims.

*Example I*

Two catalyst-adsorbent composites were evaluated for hydrogen bromide adsorption capacity and oxidation of adsorbed hydrogen bromide. One of the catalyst-adsorbent composites was "conventional" magnesia containing 5% copper oxide deposited thereon, hereinafter designated as catalyst "A." The second catalyst-adsorbent composite was magnesia composited with zirconia in a mole ratio of 1:1 and containing 5% copper oxide deposited thereon, hereinafter designated as catalyst "B." A comparative evaluation of catalyst "A" and catalyst "B" was accomplished by charging hydrogen bromide, diluted tenfold with nitrogen, upflow through a fixed bed of each of the catalyst-adsorbent composites. The initial temperature was about 183° C., rising to about 330–370° C. as hydrogen bromide was added. The reactor effluent was passed through a series of caustic scrubbers. When hydrogen bromide appeared in the reactor effluent, the hydrogen bromide charge was halted. The scrubbers were analyzed for hydrogen bromide and the results subtracted from the amount charged to determine the mass of hydrogen bromide adsorbed on the catalyst. Catalyst "A" was found to have adsorbed 20.5 grams of hydrogen bromide, or 0.73 grams per gram of magnesia, and catalyst "B" was found to have adsorbed 15.3 grams of hydrogen bromide, or 1.36 grams per gram of magnesia. Thereafter, the effluent scrubbers were replaced and air was charge upflow through the catalyst bed at about 300° C. The scrubbers were replaced at timed intervals, and conversion of hydrogen bromide during the interval was calculated from the rate and duration of the air flow and the amount of bromine in the scrubbers. The comparative results of catalyst "A" and catalyst "B" are set out below:

| Elapsed Time, minutes | 5 | 10 | 15 | 20 |
|---|---|---|---|---|
| Percent Conversion: | | | | |
| Cat. "A" | 20 | 37 | 50 | 56 |
| Cat. "B" | 23 | 45 | 65 | 85 |

*Example II*

200 cubic centimeters of a 14 mesh catalyst-adsorbent composite (176.1 grams) was located in a fixed bed of a vertical tubular reactor. The catalyst-adsorbent composite consisted of magnesia composited with zirconia on a mole ratio of 1:1 and containing 5% copper oxide deposited thereon. Isopropyl bromide was preheated and charged upflow through the catalyst bed. The reactor effluent was recovered through a series of caustic scrubbers. Before the hydrogen bromide capacity of the catalyst-adsorbent composite was reached, the isopropyl bromide flow was halted and the reactor purged with nitrogen. Thereafter, air was charged upflow through the catalyst bed and the reactor effluent recovered through a series of caustic scrubbers. The scrubbers were in each case analyzed and the results combined with the flow rate and duration to determine the amount of adsorbed hydrogen bromide and the percent bromine regenerated therefrom. This sequence of steps was repeated seven times using the same catalyst-adsorbent composite. The results are tabulated below.

| Period No | 1 | 2 | 3 | 4 | 5 | 6 | 7 |
|---|---|---|---|---|---|---|---|
| Dehydrobromination: | | | | | | | |
| Duration, minutes | 30 | 28 | 22 | 22 | 23 | 25 | 20 |
| Temperature, °C.— | | | | | | | |
| Initial | 249 | 250 | 250 | 249 | 300 | 349 | 251 |
| Maximum | 353 | 356 | 355 | 352 | 402 | 427 | 355 |
| LHSV [1] | 1.11 | 1.10 | 1.10 | 1.10 | 1.16 | 1.14 | 1.20 |
| Conversion, percent [2] | 100 | 100 | 100 | 100 | 100 | 100 | 100 |
| HBr added to cat., -- | 95.3 | 88.0 | 69.9 | 69.9 | 76.0 | 80.9 | 68.0 |
| Regeneration: | | | | | | | |
| Duration, minutes | 45 | 61 | 44 | 41 | 42 | 44 | 42 |
| Temperature, °C.— | | | | | | | |
| Initial | 306 | 306 | 249 | 301 | 301 | 303 | 298 |
| Maximum | 457 | 380 | 372 | 416 | 416 | 402 | 381 |
| GHSV [3] | 425 | 425 | 425 | 390 | 425 | 425 | 425 |
| Br₂ regenerated, ----- | 71.8 | 79.1 | 65.6 | 67.4 | 85.8 | 83.9 | 56.2 |

[1] Liquid hourly space velocity, isopropyl bromide.
[2] Of isopropyl bromide.
[3] Gaseous hourly space velocity, air.

I claim as my invention:

1. A method for producing bromine from a mixture of hydrogen bromide and olefinic hydrocarbon which comprises contacting said mixture with a composite of an oxide of a metal selected from the group consisting of magnesium, calcium and zinc and an oxide of a metal of Group IV–B of the Periodic Table at conditions to sorb the hydrogen bromide in said composite, and thereafter contacting the composite containing sorbed hydrogen bromide with an oxygen-containing gas at conditions effective for the oxidation of the sorbed hydrogen bromide.

2. The method of claim 1 further characterized in that said composite comprises magnesia composited with zirconia in a mole ratio of from about 0.5:1 to about 5:1 and containing from about 1% to about 10% copper oxide deposited thereon.

3. The method of claim 1 further characterized in that said composite comprises an oxide of a metal selected from the group consisting of magnesium, calcium, and zinc composited with an oxide of a metal of Group IV–B of the Periodic Table in a mole ratio of from about 0.5:1 to about 10:1.

4. The method of claim 1 further characterized in that said composite contains from about 0.1% to about 15% of an oxide of a metal selected from the group consisting of copper and cerium deposited thereon.

5. The method of claim 3 further characterized in that said composite contains from about 0.1% to about 15% of an oxide of a metal selected from the group consisting of copper and cerium deposited thereon.

6. The method of claim 1 further characterized in that said composite comprising magnesium composited with zirconia in a mole ratio of from about 0.5:1 to about 10:1.

7. The method of claim 6 further characterized in that said composite contains from about 0.1% to about 15% of an oxide of a metal selected from the group consisting of copper and cerium deposited thereon.

8. A method for producing bromine from a mixture of hydrogen bromide and olefinic hydrocarbon which comprises contacting said mixture with a composite of an oxide of a metal selected from the group consisting of magnesium, calcium and zinc and an oxide of a metal of Group IV–B of the Periodic Table at conditions to sorb the hydrogen bromide in said composite, and thereafter contacting the composite containing sorbed hydrogen bromide with air at a temperature of from about 50° C. to about 450° C. to oxidize the sorbed hydrogen bromide.

9. The method of claim 8 further characterized in that said composite comprises magnesia composited with zirconia in a mole ratio of from about 0.5:1 to about 5:1 and containing from about 1% to about 10% copper oxide deposited thereon.

References Cited by the Examiner

UNITED STATES PATENTS

| 1,038,359 | 9/1912 | Harries | 260—680 |
| 2,379,697 | 7/1945 | Evans et al. | 260—680 |
| 2,389,231 | 11/1945 | Blumer | 260—680 |

FOREIGN PATENTS 913,278  12/1962  Great Britain.

OTHER REFERENCES

Ladoo & Myers, Nonmetallic Minerals, McGraw-Hill, 2nd Ed., 1951, p. 408.

OSCAR R. VERTIZ, *Primary Examiner.*

DELBERT E. GANTZ, PAUL M. COUGHLAN,
*Examiners.*

V. O'KEEFE, *Assistant Examiner.*